US008579483B2

(12) United States Patent  
de Lamberterie

(10) Patent No.: US 8,579,483 B2  
(45) Date of Patent: Nov. 12, 2013

(54) OPTICAL DEVICE, IN PARTICULAR FOR AN AUTOMOTIVE VEHICLE, SUCH AS A LIGHTING OR SIGNALING DEVICE

(75) Inventor: Antoine de Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 665 days.

(21) Appl. No.: 12/698,301

(22) Filed: Feb. 2, 2010

(65) Prior Publication Data

US 2010/0195346 A1 Aug. 5, 2010

(30) Foreign Application Priority Data

Feb. 5, 2009 (FR) ..................................... 09 00507

(51) Int. Cl.  
*F21V 7/00* (2006.01)

(52) U.S. Cl.  
USPC .......................................... 362/516; 362/511

(58) Field of Classification Search  
USPC ............ 362/516, 509, 543, 311.02, 545, 560, 362/623, 616, 297, 511  
See application file for complete search history.

(56) References Cited

U.S. PATENT DOCUMENTS

| | | | |
|---|---|---|---|
| 5,219,217 A * | 6/1993 | Aikens ........................ | 362/560 |
| 5,613,751 A | 3/1997 | Parker et al. | |
| 5,618,096 A | 4/1997 | Parker et al. | |
| 5,876,107 A | 3/1999 | Parker et al. | |
| 5,921,652 A | 7/1999 | Parker et al. | |
| 6,079,838 A | 6/2000 | Parker et al. | |
| 7,250,598 B2 * | 7/2007 | Hollingsworth et al. ..... | 250/234 |
| 7,513,672 B2 | 4/2009 | Parker | |
| 7,524,101 B2 | 4/2009 | Parker | |
| 7,563,012 B2 | 7/2009 | Parker | |
| 7,661,860 B2 | 2/2010 | De Lamberterie | |
| 2006/0050282 A1 * | 3/2006 | de Lamberterie ............ | 356/452 |
| 2007/0025680 A1 * | 2/2007 | Winston et al. ............... | 385/146 |
| 2007/0268715 A1 | 11/2007 | De Lamberterie | |
| 2008/0019139 A1 | 1/2008 | Dubosc et al. | |
| 2008/0259640 A1 | 10/2008 | Parker | |
| 2008/0259642 A1 | 10/2008 | Parker | |
| 2008/0266899 A1 | 10/2008 | Parker | |
| 2009/0027920 A1 | 1/2009 | Parker | |
| 2009/0034234 A1 | 2/2009 | Parker | |
| 2009/0073719 A1 | 3/2009 | Parker | |
| 2009/0257244 A1 | 10/2009 | Parker | |
| 2009/0262552 A1 * | 10/2009 | Kamikatano et al. ......... | 362/612 |
| 2010/0238675 A1 * | 9/2010 | Dubosc et al. ................ | 362/518 |

FOREIGN PATENT DOCUMENTS

| | | |
|---|---|---|
| DE | 102005046538 A1 | 5/2007 |
| EP | 1500869 A1 | 1/2005 |
| EP | 1857732 A1 | 11/2007 |
| EP | 1881263 A1 | 1/2008 |
| EP | 1992868 A1 | 11/2008 |
| WO | 2007040527 A1 | 4/2007 |

* cited by examiner

*Primary Examiner* — Mariceli Santiago  
*Assistant Examiner* — Glenn Zimmerman  
(74) *Attorney, Agent, or Firm* — Jacox, Meckstroth & Jenkins

(57) ABSTRACT

An optical device, in particular for an automotive vehicle, such as a lighting or signaling device, comprising at least one light source, and at least one light guide designed to guide at least some of the light emitted by the light source, the light guide comprising at least one output face and at least one reflection face designed to reflect, towards the output face, light being propagated in the guide, wherein the light guide exhibits a cylindrical sheet form and/or the output face is not completely planar.

24 Claims, 2 Drawing Sheets

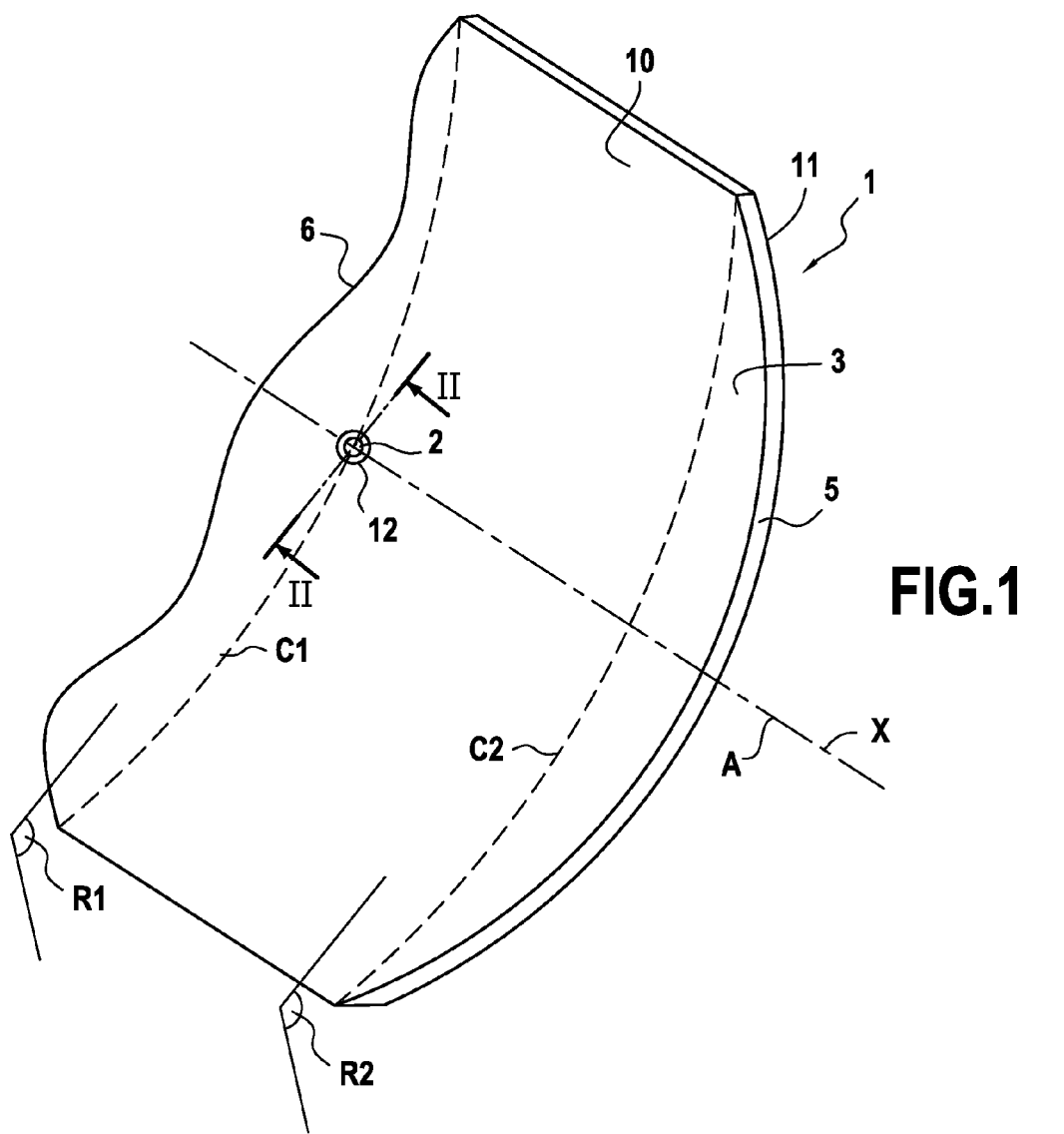
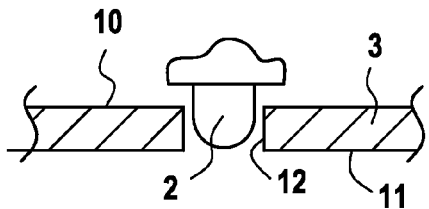
FIG.2
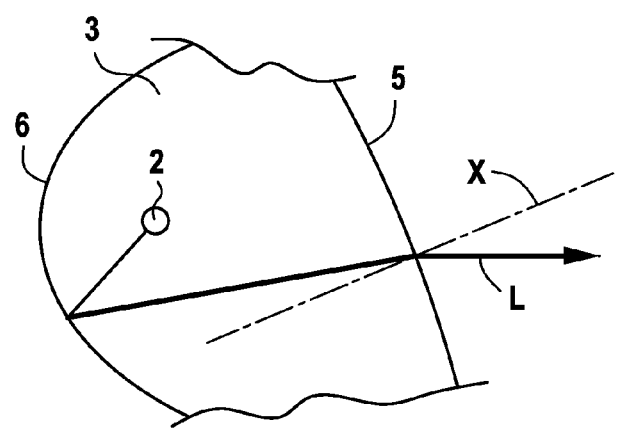
FIG.3

OPTICAL DEVICE, IN PARTICULAR FOR AN AUTOMOTIVE VEHICLE, SUCH AS A LIGHTING OR SIGNALING DEVICE

CROSS-REFERENCE TO RELATED APPLICATIONS

This application claims priority to French Application No. 0900507 filed Feb. 5, 2009, which application is incorporated herein by reference and made a part hereof.

BACKGROUND OF THE INVENTION

1. Field of the Invention

The invention relates to an optical device, in particular for an automotive vehicle, such as a lighting or signaling device.

2. Description of the Related Art

A lighting or signaling device for an automotive vehicle is known from patent application EP 1 881 263, which is equivalent to U.S. Patent Publication 2008/0019139 which is incorporated herein by reference and made a part hereof, of the applicant. The lighting device can emit a light beam "F" according to a longitudinal optical axis "A". This lighting device comprises at least one sheet for guiding the light, at least part of which appears as a portion of a spherical segment.

The guide sheet is thus delimited, in the direction of the thickness, by two guide faces substantially parallel to each other on at least some of the sheet.

The guide sheet is delimited laterally by a front output section for the light rays and by a rear reflection section for the light. The ends of the reflection section are directly connected to the ends of the output section so as to form the outer contour of the guide sheet.

The contour of the output section for the light forms a planar arc of a circle. The guide sheet comprises an input opening for the light in the sheet.

A light source is arranged in the opening close to or in contact with the input section for the light rays.

The light source can emit light rays according to a globally radial direction around a source axis "S" which is normal to the guide sheet. More precisely, the light source can radially emit a fan of light rays at least in the direction of the reflection section.

The guide sheet is made of a transparent material whose index of refraction is higher than the index of refraction of the medium in which the lighting device is intended to be immersed, air for example. Thus, a light ray introduced into the thickness of the sheet through its input section meets the higher or lower guide faces at an angle of incidence relative to the normal "N" which is higher than a limit angle of refraction. The ray can then be completely reflected by the guide faces.

The light ray is thus guided into the thickness of the guide sheet by successive reflections between the two guide faces.

The incidental light rays which emerge at the rear are intended to be reflected by the reflection section, then the light rays thus reflected are directed towards the output section. The reflected light rays thus emerge through the output section.

The light source is an light emitting diode or "LED" known as "side emitter" which emits light rays in an essentially perpendicular direction to the source axis "5".

The light source can also consist of an incandescent lamp, for example a halogen lamp, with an axial filament, inserted in the contour delimited by the input section. Advantageously it may be proposed in this case that a zone of the guide sheet, close to the input section, is made of glass, although the remainder of the sheet is made of plastic material molded onto this zone of glass. Such a design enables the thermal problems which the use of an incandescent light source might generate to be surmounted.

In the device described above the output section, or output face, exhibits a generally planar shape, with a general profile in the form of an arc of a circle.

A device with a guide sheet is known from patent application EP 1 992 868.

The above configurations correspond in particular to circular or annular profiles, and the guide zone near the source is close to a spherical portion.

There exists in particular a need, especially at the request of automotive manufacturers, for a light guide essentially of the type described above, which exhibits an output face having any arbitrary form, in particular a non-planar shape, extending either in a plane perpendicular to the optical axis or in a plane containing the optical axis.

SUMMARY OF THE INVENTION

The invention notably aims at fulfilling this need.

One object of the invention is therefore an optical device, in particular for an automotive vehicle, such as a lighting or signaling device, comprising:
at least one light source;
at least one light guide designed to guide at least some of the light emitted by the light source, the light guide comprising at least one output face and at least one reflection face designed to reflect, towards the output face, light being propagated in the guide;
wherein the light guide exhibits a cylindrical sheet form.

In the present invention, a cylinder designates a surface in the space, defined by a straight line, called generatrix, on the one hand passing through a variable point following a closed or open curve, known as directrix curve, and on the other hand maintaining a fixed direction.

A sheet designates a solid exhibiting two principal faces, planar or curved, which are substantially parallel to each other and the thickness of this solid, measured between the two principal faces, is substantially less than dimensions, such as length or width, of these principal faces.

The cylindrical sheet according to the invention is preferably non-planar.

The construction of the optical device according to the invention enables a light guide with an output face exhibiting any arbitrary shape to be obtained, which meets the automotive manufacturers' requirements.

This construction in particular provides a light guide with an output face having a shape which could not be obtained using a spherical segment light guide, such as described in patent application EP 1 881 263, which is equivalent to U.S. Patent Publication 2008/0019139, mentioned above.

In an illustrative embodiment of the invention, the output face of the light guide is different from a planar portion, that is to say this output face is not entirely contained in one plane.

If desirable, the output face is contained in a three dimensional surface, in particular different from a sphere.

This output face can be included in a ruled surface or, alternatively, in whatever non-ruled surface.

The term "ruled surface" means a surface through each point of which a straight line contained in the surface passes.

If necessary, the output face is designed to diffuse the light emerging from this output face, in particular by means of flutes on this output face.

The output face can exhibit a closed or open annular form.

In an illustrative embodiment of the invention, the reflection face of the light guide is included in a ruled surface described by straight lines, perpendicular to the longitudinal axis of the cylindrical sheet.

Alternatively, the reflection face is included in two ruled surfaces which intersect in particular forming at the intersection an angle varying between 70° and 110°, and in particular near to 90°.

The reflection face can exhibit a closed or open annular form.

The light guide can be monolithic, being made of a single block, for example by molding a plastic material.

In an illustrative embodiment of the invention, the light guide comprises at least one input cavity for the light, this cavity in particular being designed to receive the light source at least partially. This cavity preferably opens onto at least one of the principal faces of the light guide, and not for example onto a rear section of this sheet.

Possibly, this cavity is traversing.

If necessary, the light source remains on the surface of the light guide.

If desirable, the device comprises a plurality of light sources designed to illuminate the light guide.

In an illustrative embodiment of the invention, the device is designed, through the output face of the light guide, to emit light with a luminous intensity ranging between 50 candelas and 1000 candelas.

The optical device for example can fulfill one of the following types of function: DRL (daytime running light), brake light, fog light, direction indicator light or reversing light.

For example the guide light has a thickness ranging between 2 mm and 6 mm, in particular between 3 mm and 5 mm.

If necessary, the reflection face, at least over part of its length, can be aluminized.

Alternatively, the rear reflection face is designed to allow reflection of the light being propagated in the guide by simple or double total reflection.

This double total reflection results in particular if the reflection face is included in two ruled surfaces which intersect.

Preferably, the light guide is designed so that the light beam emerging from the output face is substantially parallel to the optical axis of the device so that illumination issuing from the guide appears substantially homogeneous.

For example, the light source comprises at least one LED, in particular an LED with radial radiation.

If desirable, the device comprises a plurality of light guides arranged side by side.

In an illustrative embodiment of the invention, the light guide is extended, from the side of its output face, by a portion guiding the light which not necessarily exhibits the form of a cylindrical sheet.

The object of the invention is also an optical device, in particular for an automotive vehicle, such as a lighting or signaling device, comprising:
 at least one light source;
 at least one light guide designed to guide at least some of the light emitted by the light source, the light guide comprising at least one output face and at least one reflection face designed to reflect, towards the output face, light being propagated in the guide;
 wherein the output face of the light guide is not completely planar.

Yet another object of the invention is a light guide designed to guide at least some of the light emitted by a light source, the light guide comprising at least one output face and at least one reflection face designed to reflect, towards the output face, light being propagated in the guide, this light guide exhibiting a cylindrical sheet form.

The invention also relates to a manufacturing process of a light guide, this light guide being designed to guide at least some of the light emitted by a light source, the light guide comprising at least one output face and at least one reflection face designed to reflect, towards the output face, light being propagated in the guide, this light guide exhibiting an optical axis, the output face having an imposed predetermined shape, the process comprising the following steps of:
 a) obtaining a geometrical cylindrical sheet contour by extruding the output face parallel to the optical axis;
 b) carrying out a geometrical operation so as to unfold the cylindrical sheet contour and making it planar;
 c) obtaining, for this geometrical unfolded sheet contour, a shape of the reflection face(s);
 d) obtaining the cylindrical sheet form (in three dimensions) depending on the shape of the reflection face and
 e) manufacturing, in particular by molding a plastic material, the light guide with the cylindrical sheet form obtained.

In an illustrative embodiment of the invention, the unfolded sheet contour obtained in step b) can exhibit an unfolded output face with a planar contour, this unfolded output face being obtained depending on the output face imposed.

In step c), the contour of the reflection face is obtained on the basis of a planar profile of the contour of the output face obtained previously, by considering preservation of the optical path on the reflection face.

According to the invention, the entire sheet can be cylindrical or correspond to a ruled surface.

The output face can be a complex 3D curve not included in a plane or a sphere.

The ruled surface property of the sheet can appear in particular around to the light source.

The invention permits guides with a relatively complex profile to be created.

According to the invention, the guide can be made by extrusion.

These and other objects and advantages of the invention will be apparent from the following description, the accompanying drawings and the appended claims.

BRIEF DESCRIPTION OF THE ACCOMPANYING DRAWINGS

The invention can be better understood on reading the following detailed description of non-restrictive illustrative embodiments of the invention and on examining the appended drawing, wherein:

FIG. 1 illustrates, schematically and partially, in perspective, an optical device according to an illustrative embodiment of the invention;

FIG. 2 shows, schematically and partially, according to a transverse section along II-II, the device in FIG. 1;

FIG. 3 illustrates, schematically and partially, the path of a light ray reflected on the reflection face of the light guide of the device in FIG. 1;

DETAILED DESCRIPTION OF THE PREFERRED EMBODIMENTS

Figure 6:
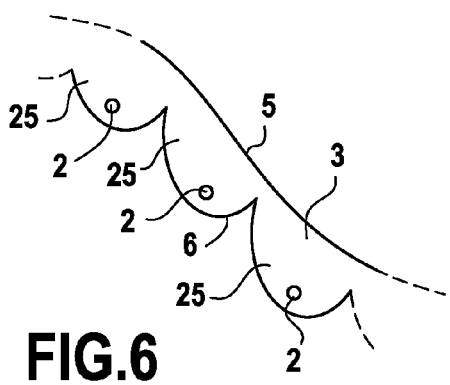
FIG. 6 shows, schematically and partially, a light guide according to another illustrative embodiment of the invention.

FIGS. 1 and 3 feature an optical device 1 for an automotive vehicle, such as a lighting or signaling device, comprising:
a light source 2 formed by an LED with radial radiation;
a light guide 3 designed to guide some of the light emitted by the light source 2, the light guide 3 comprising at least one output face 5 and at least one reflection face 6 designed to reflect, towards the output face 5, light L being propagated in light guide 3.

The light guide 3 exhibits the form of a non-planar cylindrical sheet with the longitudinal axis X and two non-planar principal faces 10 and 11, which are substantially parallel to each other.

In the example described, the cylindrical sheet is open, that is to say it has not closed again on itself around the longitudinal axis X.

The thickness of this light guide 3, measured between the two principal faces 10 and 11, for example ranges between 3 mm and 5 mm.

FIG. 1, for better clarity of the drawing, shows the intersections (dotted lines C1 and C2) between two planes R1 and R2 (perpendicular to the longitudinal axis X) with the cylindrical sheet.

The output face 5 of the light guide 3 is different from a planar portion, that is to say this output face 5 is not entirely contained in the plane R2.

In particular, this output face 5 is contained in a three dimensional surface different from a sphere.

This output face 5 can comprise flutes to diffuse the light emerging from this output face 5.

In addition the reflection face 6 of the light guide 3 is included in a ruled surface described by straight lines, perpendicular to the cylindrical sheet.

Alternatively, the reflection face 6 can be included in two ruled surfaces which intersect in particular forming at the intersection an angle varying between 70° and 110°, and in particular near to 90°.

In the example described, the light guide 3 is monolithic, being made of a single block, for example by molding a plastic material with an index of refraction n.

The plastic material used for example can be PMMA with an index of refraction 1.49 or PC with an index of refraction 1.59.

The reflection face 6, at least over a portion of its length, can be aluminized or, alternatively, the latter is designed to allow reflection of the light being propagated in light guide 3 by simple or double total reflection.

As illustrated in FIG. 2, the light guide 3 comprises an input cavity 12 for the light, this cavity 12 being designed to receive the light source 2 at least partially.

This cavity 12, which is traversing, opens onto the principal faces 10 and 11 of the light guide 3.

In the example described, optical device 1 is designed, through the output face 5 of the light guide 3, to emit a light of luminous intensity ranging between 50 candelas and 1000 candelas.

The light guide 3 is designed so that the light beam resulting from the output face 5 is substantially parallel to the optical axis A of the optical device 1 so that illumination issuing from the light guide 3 appears substantially homogeneous and so that on average the rays are directed along the optical axis A.

In the example described, the optical axis A and the longitudinal axis X are merged.

The process for manufacturing the light guide 3 will now be described in detail.

It should be noted that this process aims at obtaining a light guide 3 with a predetermined output face 5, the three dimensional shape of which is imposed for example by one automotive manufacturer.

As will be seen below, the process comprises a major step of determining the shape of the reflection face 6 which is adapted with respect to the imposed output face 5, so that the output face 5 is seen in a homogeneous way and so that the rays emerging from the output face 5, on average, leave it according to the direction of the optical axis A.

Figure 4:
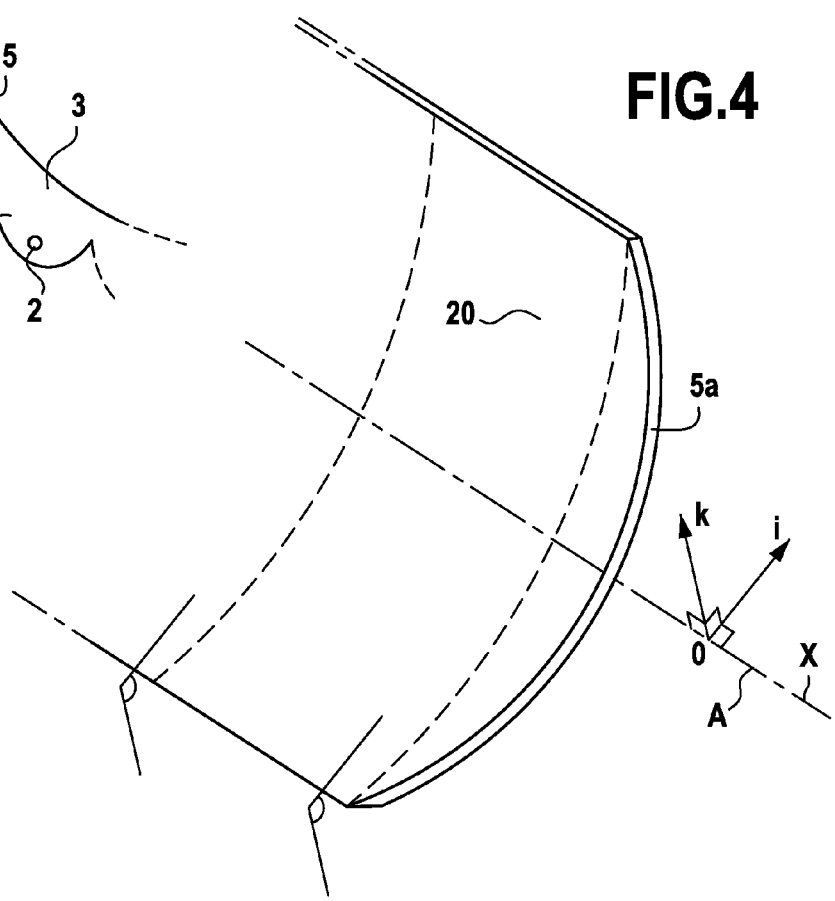
FIG. 4 shows, schematically and partially, a geometrical cylindrical sheet contour obtained by extruding the output face of the light guide in FIG. 1.

The inventive process comprises the following steps of:
a) obtaining a geometrical cylindrical sheet contour 20 by extruding (in geometrical terms) the output face 5 of the optical axis A, as illustrated in FIG. 4;
b) carrying out a geometrical operation so as to unfold cylindrical sheet contour 20 and making it planar;
c) obtaining, for this geometrical unfolded sheet contour 20, the shape of the reflection face 6;
d) obtaining the cylindrical sheet form (in three dimensions) according to the shape of the reflection face 6; and
e) manufacturing, by molding a plastic material, the light guide 3 with the cylindrical sheet form obtained.

In the example described, unfolded sheet contour 20 obtained in step b) can exhibit an unfolded output face 5a with a planar contour, this planar unfolded output face 5a being obtained on the basis of the imposed output face 5.

This unfolded output face 5a with a planar contour can be obtained in the following way.

Let us consider the optical axis A, (Oi) a horizontal axis and (Ok) a vertical axis, and a point M of coordinates (x, y, z) of the contour of the imposed output face 5

The contour of the unfolded output face 5a is calculated in the following way.

Let us consider a point M' of this contour.

This point M' of coordinates (x', y', z'), image of the point M, is determined as follows.

$z' = 0$ $y' = y$ $x'$ is calculated on the basis of the curvilinear x-coordinate of the projection of the three dimensional profile of the imposed output face 5 on a plane perpendicular to optical axis A.

Once contour 20 of the sheet has been unfolded and the contour of the unfolded output face 5a has been determined, the planar reflection face 6a (see FIG. 5) is calculated using the principle of preserving the optical path on the reflection face 6a.

Figure 5:
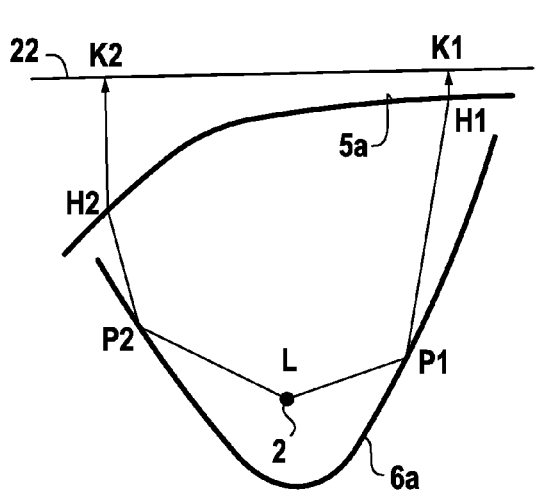
FIG. 5 illustrates, schematically and partially, the principle of calculating the profile of the reflection face of the guide in FIG. 1.

With reference to FIG. 5, this principle corresponds to the fact that the optical path between the light source 2 and output wave surface 22 is constant, namely $$n*(LP1)+n*(P1H1)+(H1K1)=n*(LP2)+n*(P2H2)+(H2K2)=\text{constant}$$

P1 and P2 are points of the unfolded planar reflection face 6a, H1 and H2 points of the unfolded output face 5a, K1 and K2 points of the wave surface 22, and L a point designating the light source 2.

Determining the profile of the unfolded planar reflection face 6a amounts to finding the place described by points P1, P2.

The applicant has noted that this method is particularly effective and enables satisfactory results to be obtained quickly.

Then the sheet with the contour of the reflection face 6 is reconstructed and adapted by carrying out a geometrical operation of folding the sheet in the following way.

After step c) the contour of the reflection face 6 which intersects the sheet is obtained. Folding the sheet (step d)) results in the contour in question.

The three dimensional reflection face 6 is constructed as one or more ruled surfaces which are based on the new contour.

Let us consider P of coordinates (x, y, z) a point of the contour of the planar reflection face 6a and P' of coordinates (x', y', z') a point of the contour of the final reflection face 6 on the sheet known as 'real'.

Therefore:

y'=y and x' and z' are calculated by considering the point associated with the front profile.

The profile of the reflection face 6 is calculated for the 'real' sheet in three dimensions by constructing this rear reflection face 6 so that it is included in a ruled surface made up of all the segments of straight lines perpendicular to the sheet at any point of the profile of the reflection face 6.

In one case, the ruled surface is defined with all the normals to the sheet which pass through the contour.

Alternatively, two surfaces defined by straight lines passing through the contour and forming an angle of 90° relative to each other, the bisectrix of the two straight lines being tangent to the sheet, are created.

Of course, the invention is not limited to the illustrative embodiment which has just been described.

For example, as illustrated in FIG. 6, the light guide 3 can comprise several petals 25 placed end to end, enabling a light guide 3 of large dimensions to be created while preserving a reasonable depth.

Moreover, this enables functions with a strong intensity to be obtained by using several LEDs each having a relatively low flux.

Figure 7:
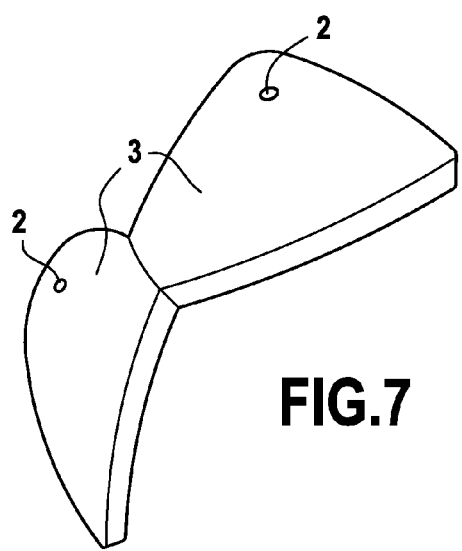
FIG. 7 shows, schematically and partially, an optical device with two light guides side by side, according to another illustrative embodiment of the invention.

For example again, as illustrated in FIG. 7, the optical device 1 can comprise two light guides 3 arranged in an adjacent way.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. An optical device for an automotive vehicle, said optical device comprising:
at least one light source; and
at least one light guide designed to guide at least some of the light emitted by said at least one light source, said at least one light guide comprising at least one output face and at least one reflection face designed to reflect, towards said at least one output face, light being propagated in said at least one light guide, said at least one output face being configured so that light reflected by said at least one reflection face is homogeneously seen on said at least one output face;
wherein said at least one light guide exhibits a cylindrical sheet form;
wherein said at least one reflection face is included in two ruled surfaces which intersect while forming at the intersection an angle of between 70° and 110°.

2. The optical device according to claim 1, wherein said at least one output face is contained in a three dimensional surface, said three dimensional surface being different from a sphere.

3. The optical device according to claim 1, wherein said at least one output face is designed to diffuse the light leaving said at least one output face using flutes on said at least one output face.

4. The optical device according to claim 1, wherein said at least one reflection face of said at least one light guide is included in a ruled surface described by straight lines perpendicular to a longitudinal axis (X) of the cylindrical sheet.

5. The optical device according to claim 1, wherein said at least one reflection face is included in two ruled surfaces which intersect while forming at the intersection an angle of between 70° and 110°.

6. The optical device according to claim 1, wherein said at least one light guide is monolithic by molding a plastic material.

7. The optical device according to claim 1, wherein said at least one light guide comprises at least one input cavity for the light, said at least one input cavity being designed to receive said at least one light source at least partially.

8. The optical device according to claim 1, wherein said at least one light guide is designed so that a light beam issuing from said at least one output face is substantially parallel to an optical axis of said optical device.

9. The optical device according to claim 1, wherein said at least one light source comprises at least one LED with radial radiation.

10. The optical device according to claim 1, wherein said at least one light guide is extended, on the side of said at least one output face, by a portion guiding the light which exhibits a cylindrical sheet form or otherwise.

11. An optical device, for an automotive vehicle comprising:
at least one light source; and
at least one light guide designed to guide at least some of the light emitted by said at least one light source, said at least one light guide comprising at least one output face and at least one reflection face designed to reflect, towards said at least one output face, light being propagated in said at least one light guide, said at least one output face being configured so that light reflected by said at least one reflection face is homogeneously seen on said at least one output face;
wherein said at least one output face of said at least one light guide is not completely planar;
wherein said at least one reflection face is included in two ruled surfaces which intersect while forming at the intersection an angle of between 70° and 110°.

12. A light guide designed to guide at least some of the light emitted by a light source, said light guide comprising:
at least one output face; and
at least one reflection face designed to reflect, towards said at least one output face, light being propagated in said light guide, said light guide exhibiting a cylindrical sheet form;
wherein said at least one output face being adapted so that light reflected by at least one reflection face is homogeneously seen on said at least one output face;

said at least one reflection face is included in two ruled surfaces which intersect while forming at the intersection an angle of between 70° and 110°.

13. A process for manufacturing said optical device of claim 1, said optical device being designed to guide at least some of the light emitted by a light source, said optical device comprising at least one output face and at least one reflection face designed to reflect, towards said at least one output face, light being propagated in said optical device, said optical device exhibiting an optical axis and said at least one output face exhibiting a predetermined shape, the process comprising the following steps of:
   a) obtaining a geometrical cylindrical sheet contour parallel to each other by extruding said at least one output face of said optical axis;
   b) carrying out a geometrical operation so as to unfold said cylindrical sheet contour and making it planar;
   c) obtaining, for this geometrical unfolded sheet contour, a reflection face shape;
   d) obtaining a cylindrical sheet form according to said reflection face shape; and
   e) manufacturing, in particular by molding a plastic material, said optical device with said cylindrical sheet form obtained.

14. The process according to claim 13, wherein said unfolded sheet contour obtained in step b) exhibits an unfolded output face in particular with a planar contour.

15. The process according to claim 13, wherein in step c), the contour of said at least one reflection face is obtained on the basis of a planar profile of said at least one output face obtained in the step c/, by considering preservation of an optical path on said at least one reflection face.

16. The optical device according to claim 2, wherein said at least one output face is designed to diffuse the light leaving said at least one output face using flutes on said at least one output face.

17. The optical device according to claim 2, wherein said at least one reflection face of said at least one light guide is included in a ruled surface described by straight lines perpendicular to a longitudinal axis (X) of the cylindrical sheet.

18. The optical device according to claim 3, wherein said at least one reflection face of said at least one light guide is included in a ruled surface described by straight lines perpendicular to a longitudinal axis (X) of the cylindrical sheet.

19. The optical device according to claim 2, wherein said at least one reflection face is included in two ruled surfaces which intersect while forming at the intersection an angle of between 70° and 110°.

20. The optical device according to claim 3, wherein said at least one reflection face is included in two ruled surfaces which intersect while forming at the intersection an angle of between 70° and 110°.

21. The optical device according to claim 1, wherein said angle is approximately 90°.

22. The optical device according to claim 5, wherein said angle is approximately 90°.

23. The optical device according to claim 1, wherein said optical device is at least one of a lighting device or a signaling device.

24. The optical device according to claim 11, wherein said optical device is at least one of a lighting device or a signaling device.

* * * * *